United States Patent
Inukai et al.

(10) Patent No.: US 12,435,187 B2
(45) Date of Patent: Oct. 7, 2025

(54) METHOD FOR PRODUCING RESIN PARTICLE DISPERSION, METHOD FOR PRODUCING TONER FOR ELECTROSTATIC IMAGE DEVELOPMENT, AND TONER FOR ELECTROSTATIC IMAGE DEVELOPMENT

(71) Applicant: FUJIFILM Business Innovation Corp., Tokyo (JP)

(72) Inventors: Takashi Inukai, Kanagawa (JP); Keita Yamamoto, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 937 days.

(21) Appl. No.: 17/411,663

(22) Filed: Aug. 25, 2021

(65) Prior Publication Data
US 2022/0306815 A1   Sep. 29, 2022

(30) Foreign Application Priority Data
Mar. 26, 2021 (JP) .................. 2021-054287

(51) Int. Cl.
*C08J 3/07* (2006.01)
*B01F 23/40* (2022.01)
(Continued)

(52) U.S. Cl.
CPC ................ *C08J 3/07* (2013.01); *B01F 23/41* (2022.01); *B01F 23/43* (2022.01); *B01F 23/49* (2022.01);
(Continued)

(58) Field of Classification Search
CPC .......... C08J 3/07; C08J 2367/02; B01F 23/41; B01F 23/43; B01F 23/49; B01F 23/4142;
(Continued)

(56) References Cited

U.S. PATENT DOCUMENTS 5,985,505 A * 11/1999 Lincoln ................ G03G 5/0696
430/135
8,007,974 B2 * 8/2011 Nakayama ......... G03G 9/09783
430/108.4
10,459,290 B2 * 10/2019 Hisakado ............. G02B 5/3033

FOREIGN PATENT DOCUMENTS

| JP | 2010-77319 A | 4/2010 |
| JP | 2015174871 A * | 10/2015 |
| (Continued) | | |

OTHER PUBLICATIONS

Takahiro, JP-2017181576-MT (Year: 2017).*
(Continued)

*Primary Examiner* — Robert S Jones, Jr.
*Assistant Examiner* — Zhen Liu
(74) *Attorney, Agent, or Firm* — Sughrue Mion, PLLC (57) ABSTRACT

A method for producing a resin particle dispersion includes: obtaining a phase-inverted emulsion by adding a neutralizer to a resin solution prepared by dissolving a resin having an acid value in an organic solvent to thereby neutralize the resin and then adding an aqueous medium to the resulting resin solution to subject the resin to phase inversion emulsification; and removing the organic solvent from the phase-inverted emulsion. In the course of obtaining the phase-inverted emulsion, a maximum agitation power per unit mass (kg) of the resin when the resin solution containing the aqueous medium added thereto is agitated to perform the phase inversion emulsification is from 0.4 W to 20 W inclusive.

20 Claims, 1 Drawing Sheet

(51) Int. Cl.
  *B01F 23/41* (2022.01)
  *B01F 23/43* (2022.01)
  *B82Y 40/00* (2011.01)
  *G03G 9/08* (2006.01)
  *G03G 9/12* (2006.01)
  *G03G 9/125* (2006.01)
  *G03G 9/13* (2006.01)

(52) U.S. Cl.
  CPC ........... *G03G 9/0823* (2013.01); *G03G 9/125* (2013.01); *G03G 9/132* (2013.01); *B01F 23/4142* (2022.01); *B01F 23/4146* (2022.01); *B01F 23/48* (2022.01); *B82Y 40/00* (2013.01); *G03G 9/122* (2013.01)

(58) Field of Classification Search
  CPC ............... B01F 23/4146; B01F 23/48; B01F 2215/0427; B01F 2215/0463; B01F 27/07261; G03G 9/0823; G03G 9/125; G03G 9/132; G03G 9/122; G03G 9/0804; G03G 9/08755; B82Y 40/00
  See application file for complete search history.

(56) References Cited

FOREIGN PATENT DOCUMENTS

| | | | |
|---|---|---|---|
| JP | 2017181576 A | * | 10/2017 |
| JP | 2018-131544 A | | 8/2018 |
| JP | 2018193493 A | * | 12/2018 |
| JP | 2019111462 A | * | 7/2019 |

OTHER PUBLICATIONS

Naoya, JP-2018193493-MT (Year: 2018).*
Takeshi, JP2015174871-MT (Year: 2015).*
Sumihiro, JP-2019111462-MT (Year: 2019).*
Office Action issued Jan. 14, 2025 in Japanese Application No. 2021-054287.

* cited by examiner

METHOD FOR PRODUCING RESIN PARTICLE DISPERSION, METHOD FOR PRODUCING TONER FOR ELECTROSTATIC IMAGE DEVELOPMENT, AND TONER FOR ELECTROSTATIC IMAGE DEVELOPMENT

CROSS-REFERENCE TO RELATED APPLICATIONS

This application is based on and claims priority under 35 USC 119 from Japanese Patent Application No. 2021-054287 filed Mar. 26, 2021.

BACKGROUND

(i) Technical Field

The present disclosure relates to a method for producing a resin particle dispersion for a toner, to a method for producing a toner for electrostatic image development, and to a toner for electrostatic image development.

(ii) Related Art

For example, Japanese Unexamined Patent Application Publication No. 2018-193493 discloses "a method for producing a dispersion containing resin particles having an acid group, the method using a phase inversion emulsification method including the following steps: step 1 of mixing a resin having an acid value and an organic solvent to produce a solution; step 2 of adding a neutralizer to the solution obtained in step 1 to thereby obtain a neutralized solution mixture having a viscosity of 100 to 1000 mPa·s; step 3 of checking the varicosity of the neutralized solution mixture obtained in step 2 and then adding water to 100 parts by mass of the resin having an acid value at an addition rate of 0.5 to 50 parts by mass/minute to thereby obtain an emulsion of the particles of the resin having an acid value; and step 4 of removing the organic solvent from the emulsion obtained in step 3 to thereby obtain a dispersion of the particles of the resin particles having an acid value."

Japanese Unexamined Patent Application Publication No. 2018-131544 discloses "a method for producing a polyester latex dispersion using a phase inversion emulsification method including the following steps: step 1 of mixing a polyester resin and an organic solvent to produce a solution 13; step 2 of mixing a neutralizer (1)14 to the solution 13 obtained in step 1, the neutralizer being added in such an amount that the viscosity of the resulting solution is in the range of 5 to 500 mPa·s; step 3 of checking the state of the solution 15 obtained in step 2, determining the amount of a neutralizer (2)16 that causes the viscosity of the solution to fall within the range of 50 to 1000 mPa·s, and adding the neutralizer (2)16 at least once; step 4 of adding pure water 18 continuously to the solution 17 obtained in step 3 to form resin particles to thereby obtain a resin particle dispersion 19; and step 5 of removing the organic solvent 12 from the resin particle dispersion 19 obtained in step 4."

SUMMARY

Aspects of non-limiting embodiments of the present disclosure relate to a method for producing a resin particle dispersion, the method including: obtaining a phase-inverted emulsion by adding a neutralizer to a resin solution prepared by dissolving a resin having an acid value in an organic solvent to thereby neutralize the resin and adding an aqueous medium to subject the resin to phase inversion emulsification; and removing the organic solvent from the phase-inverted emulsion. With this method, the occurrence of coarse particles and fine particles is reduced as compared to that when a maximum agitation power per unit mass (kg) of the resin is less than 0.4 W or more than 20 W during phase inversion emulsification performed by agitating the resin solution containing the aqueous medium added thereto in order to obtain the phase-inverted emulsion.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a method for producing a resin particle dispersion, the method including:

obtaining a phase-inverted emulsion by adding a neutralizer to a resin solution prepared by dissolving a resin having an acid value in an organic solvent to thereby neutralize the resin and then adding an aqueous medium to the resulting resin solution to subject the resin to phase inversion emulsification; and removing the organic solvent from the phase-inverted emulsion, wherein, in the course of obtaining the phase-inverted emulsion, a maximum agitation power per unit mass (kg) of the resin when the resin solution containing the aqueous medium added thereto is agitated to perform the phase inversion emulsification is from 0.4 W to 20 W inclusive.

BRIEF DESCRIPTION OF THE DRAWING

Exemplary embodiments of the present disclosure will be described in detail based on the following FIGURE, wherein.

DETAILED DESCRIPTION

Figure 1:
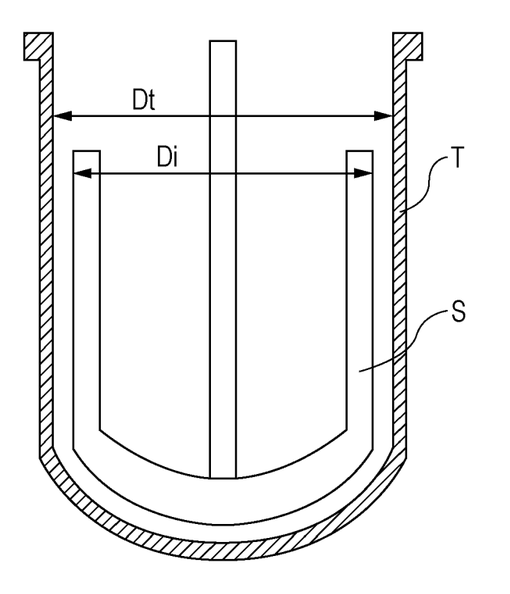
FIGURE is a schematic configuration diagram showing an example of an emulsification tank equipped with a mixing impeller and suitably used for a resin particle dispersion production method according to an exemplary embodiment.

Exemplary embodiments of the present disclosure will be described below. The description and Examples are illustrative of the present disclosure and are not intended to limit the scope of the present disclosure.

In the present specification, a numerical range represented using "to" means a range including the numerical values before and after the "to" as the minimum value and the maximum value, respectively.

In a set of numerical ranges expressed in a stepwise manner in the present specification, the upper or lower limit in one numerical range may be replaced with the upper or lower limit in another numerical range in the set. Moreover, in a numerical range described in the present specification, the upper or lower limit in the numerical range may be replaced with a value indicated in an Example.

In the present specification, the term "step" is meant to include not only an independent step but also a step that is not clearly distinguished from other steps, so long as the prescribed purpose of the step can be achieved.

In the present specification, when an exemplary embodiment is explained with reference to the drawings, the structure of the exemplary embodiment is not limited to the structure shown in the drawings. In the drawings, the sizes of the components are conceptual, and the relative relations between the components are not limited to these relations.

In the present specification, any component may contain a plurality of materials corresponding to the component. In the present disclosure, when reference is made to the amount of a component in a composition, if the composition contains a plurality of materials corresponding to the component, the amount means the total amount of the plurality of materials, unless otherwise specified.

In the present specification, the "toner for electrostatic image development" may be referred to simply as a "toner."

<Resin Particle Dispersion Production Method>

A resin particle dispersion production method according to an exemplary embodiment includes the steps of: obtaining a phase-inverted emulsion by adding a neutralizer to a resin solution prepared by dissolving a resin having an acid value in an organic solvent to thereby neutralize the resin and adding an aqueous medium to subject the resin to phase inversion emulsification; and removing the organic solvent from the phase-inverted emulsion.

In the course of obtaining the phase-inverted emulsion, a maximum agitation power per unit mass (kg) of the resin when the resin solution containing the aqueous medium added thereto is agitated to perform phase inversion emulsification is from 0.4 W to 20 W inclusive.

In the resin particle dispersion production method according to the present exemplary embodiment, the occurrence of coarse particles and fine particles is reduced. The reason for this may be as follows.

For example, the resin particle dispersion is produced by dissolving a resin in an organic solvent, neutralizing the resin, mixing the resin with water to subject the resin to phase inversion emulsification to thereby finely disperse the resin in the aqueous medium, and then removing the organic solvent by reduced pressure distillation.

However, in the course of producing the resin particle dispersion, coarse particles and fine particles are generated in some cases. One possible cause of this is insufficient agitation of the phase-inverted emulsion that may cause phase inversion to occur unevenly during phase inversion emulsification, so that coarse particles and fine particles are generated. Another possible cause is that an excessive agitation shearing force is applied to the phase-inverted emulsion during phase inversion emulsification, so that fine particles are generated.

In the resin particle dispersion production method according to the present exemplary embodiment, the maximum agitation power per unit mass (kg) of the resin during phase inversion emulsification is from 0.4 W to 20 W inclusive.

The agitation power is the power actually applied to the phase-inverted emulsion, and the value of the agitation power is a value obtained by subtracting, from the electric power of an agitating motor that rotates a mixing impeller during the phase inversion emulsification, the idling power of the agitating motor (the electric power of the agitating motor when the mixing impeller is rotated in an empty emulsification tank at the same rotation speed as above).

In the course of the phase inversion emulsification, the agitation power gradually increases from the beginning of the phase inversion emulsification, reaches a maximum when the phase inversion emulsification is completed, and then gradually decreases.

Therefore, when the maximum value of the agitation power during the phase inversion emulsification is 20 W or less, an excessively large shearing force is not applied to the phase-inverted emulsion, and the occurrence of fine particles generated is reduced.

When the maximum value of the agitation power per unit mass (kg) of the resin during the phase inversion emulsification is 0.4 W or more, uneven phase inversion due to insufficient agitation of the phase-inverted emulsion is prevented, and the occurrence of coarse particles and fine particles is reduced.

It is therefore inferred that, in the resin particle dispersion production method according to the present exemplary embodiment, the occurrence of coarse particles and fine particles is reduced.

From the viewpoint of energy saving and productivity, low-temperature fixability is imparted to a toner produced by an emulsification aggregation method by adding a crystalline resin and a release agent, which are low-melting temperature components, to the toner.

However, when the low-melting temperature components are exposed at the surface of the toner particles, the high-temperature shell life of the toner deteriorates, and image unevenness (image unevenness caused by a reduction in transfer efficiency due to embedment of an external additive) occurs particularly at high temperature and high humidity.

In a method for producing a toner using the emulsification aggregation method, a shell layer may be formed on the outer side of core particles containing the low-melting temperature components in order to prevent exposure of the low-melting temperature components at the surface of the toner particles.

However, when coarse particles and fine particles are present in a resin particle dispersion for forming the shell layer, balance in aggregation of the resin particles is disrupted, and the exposure of the low-melting temperature components at the surface of the toner particles is not easily prevented.

In the resin particle dispersion obtained by the resin particle dispersion production method according to the present exemplary embodiment, the occurrence of coarse particles and fine particles is reduced. Therefore, when a shell layer is formed, the exposure of the low-melting temperature components at the surface of the toner particles is reduced. Thus, with the toner obtained, image unevenness is reduced.

Next, the resin particle dispersion production method according to the present exemplary embodiment will be described in detail.

(Phase-Inverted Emulsion Preparation Step)

In the phase-inverted emulsion preparation step, a neutralizer is added to a resin solution prepared by dissolving a resin having an acid value to an organic solvent to neutralize the resin, and an aqueous medium is added to subject the resin to phase inversion emulsification to thereby obtain a phase-inverted emulsion.

In the phase inversion emulsification method, the aqueous medium (i.e., the W phase) is added to an oil phase dispersion (i.e., a resin solution used as the 0 phase) that is a continuous phase containing the resin dissolved in an organic solvent capable of dissolving the resin to thereby subject the resin to conversion (i.e., phase inversion) from W/O to O/W. The oil phase dispersion is thereby converted to a discontinuous phase, and the resin is dispersed as particles in the aqueous medium.

The phase-inverted emulsion is produced using a well-known emulsification device such as an emulsification tank equipped with an agitation impeller.

When the resin is dissolved in the organic solvent, the aqueous medium and the neutralizer may be mixed with the resin and the organic solvent.

No particular limitation is imposed on the order of addition of the resin and the organic solvent to the emulsification tank. When the resin easily dissolves in the organic solvent, the resin may be added after all the organic solvent or part of the organic solvent has been added, from the viewpoint of dissolving time.

The tube used to add the resin to the emulsification tank can be freely selected in consideration of, for example, the diameter of the pulverized resin to be added. For example, to prevent dust particles from flying during addition of the resin, a tube that can be lowered to a lower portion of the emulsification tank may be used.

No particular limitation is imposed on the position, number, and shape of nozzles used to add water to the resin solution obtained by dissolving the resin to the organic solvent. For example, the nozzles may be immersed in the solution. When a large-scale facility is used, two or more tubes may be used to add water, or a nozzle having a showerhead may be used to add water from an upper portion of the emulsification tank such that the water is sprayed over the surface of the solution.

During the phase inversion emulsification, the maximum agitation power per unit mass (kg) of the resin when the resin solution containing the aqueous medium added thereto is agitated to perform the phase inversion emulsification is from 0.4 W to 20 W inclusive. From the viewpoint of reducing the occurrence of coarse particles and fine particles, the maximum agitation power is preferably from 1 W to 12 W inclusive.

From the viewpoint of reducing the occurrence of coarse particles and fine particles, the temperature of the resin solution with the aqueous medium added thereto during the phase inversion emulsification is preferably from 20° C. to 80° C. inclusive and more preferably from 35° C. to 65° C. inclusive.

The aqueous medium may be added intermittently to the resin solution, but it is preferable to add the aqueous medium continuously to the resin solution.

From the viewpoint of reducing the occurrence of coarse particles and fine particles, the rate of addition of the aqueous medium to 10 parts by mass of the resin is preferably from 0.03 parts by mass/min to 0.80 parts by mass/min inclusive and more preferably from 0.1 parts by mass/min to 0.40 parts by mass/min inclusive.

No particular limitation is imposed on the mixing impeller used for the phase inversion emulsification. From the viewpoint of reducing the occurrence of coarse particles and fine particles, the mixing impeller may be an anchor mixing impeller.

From the viewpoint of reducing the occurrence of coarse particles and fine particles, the ratio of the impeller diameter Di of the anchor mixing impeller and the tank diameter Dt of the emulsification tank, i.e., Di/Dt (see FIGURE), is preferably from 0.90 to 0.99 inclusive and more preferably from 0.94 to 0.99 inclusive.

From the viewpoint of reducing the occurrence of coarse particles and fine particles, the number of rotations of the anchor mixing impeller is from 10 rpm to 100 rpm inclusive and more preferably from 20 rpm to 80 rpm inclusive.

The impeller diameter Di of the anchor mixing impeller means the maximum diameter of the rotation trajectory of the mixing impeller.

In FIGURE, T indicates the emulsification tank, and S indicates the anchor mixing impeller.

—Resin—

The resin used has an acid value and may be a resin having a polar group such as a carboxyl group, a sulfonic acid group, or a hydroxy group.

Any resin that can undergo phase inversion emulsification can be used.

Examples of the resin include: vinyl-based resins composed of homopolymers of monomers such as styrenes (such as styrene, p-chlorostyrene, and α-methylstyrene), (meth) acrylates (such as methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, and 2-ethylhexyl methacrylate), ethylenically unsaturated nitriles (such as acrylonitrile and methacrylonitrile), vinyl ethers (such as vinyl methyl ether and vinyl isobutyl ether), vinyl ketones (such as vinyl methyl ketone, vinyl ethyl ketone, and vinyl isopropenyl ketone), and olefins (such as ethylene, propylene, and butadiene); and vinyl-based resins composed of copolymers of combinations of two or more of the above monomers.

Other examples of the resin include: non-vinyl-based resins such as epoxy resins, polyester resins, polyurethane resins, polyamide resins, cellulose resins, polyether resins, and modified rosins; mixtures of the non-vinyl-based resins and the above-described vinyl-based resins; and graft polymers obtained by polymerizing a vinyl-based monomer in the presence of any of these resins.

One of these resins may be used alone, or two or more of them may be used in combination.

The resin used may be an amorphous resin. However, a crystalline resin (such as a crystalline polyester resin) may be used.

The amorphous resin exhibits only a stepwise endothermic change instead of a clear endothermic peak in thermal analysis measurement using differential scanning calorimetry (DSC), is a solid at room temperature, and is thermoplastic at temperature equal to or higher than its glass transition temperature.

The crystalline resin exhibits a clear endothermic peak instead of a stepwise endothermic change in the differential scanning calorimetry (DSC).

Specifically, the crystalline resin means that, for example, the half width of the endothermic peak measured at a heating rate of 10° C./minute is 10° C. or less, and the amorphous resin means a resin in which the half width exceeds 10° C. or a resin in which a clear endothermic peak is not observed.

The amorphous resin will be described.

Examples of the amorphous resin include well-known amorphous resins such as amorphous polyester resins, amorphous vinyl resins (such as styrene-acrylic resins), epoxy resins, polycarbonate resins, and polyurethane resins. Of these, amorphous polyester resins, and amorphous vinyl resins (particularly styrene-acrylic resins) resins are preferred, and amorphous polyester resins are more preferred.

The amorphous resin may be a combination of an amorphous polyester resin and a styrene-acrylic resin. Moreover, the amorphous resin used may be an amorphous resin having an amorphous polyester resin segment and a styrene acrylic resin segment.

Amorphous Polyester Resin

The amorphous polyester resin is, for example, a polycondensation product of a polycarboxylic acid and a polyhydric alcohol. The amorphous polyester resin used may be a commercial product or a synthesized product.

Examples of the polycarboxylic acid include aliphatic dicarboxylic acids (such as oxalic acid, malonic acid, maleic acid, fumaric acid, citraconic acid, itaconic acid, glutaconic acid, succinic acid, alkenyl succinic acids, adipic acid, and sebacic acid), alicyclic dicarboxylic acids (such as cyclohexanedicarboxylic acid), aromatic dicarboxylic acids (such as terephthalic acid, isophthalic acid, phthalic acid, and naphthalenedicarboxylic acid), anhydrides thereof, and lower alkyl (having, for example, 1 to 5 carbon atoms) esters thereof. In particular, the polycarboxylic acid may be an aromatic dicarboxylic acid.

The polycarboxylic acid used may be a combination of a dicarboxylic acid and a tricarboxylic or higher polycarboxylic acid having a crosslinked or branched structure. Examples of the tricarboxylic or higher polycarboxylic acid include trimellitic acid, pyromellitic acid, anhydrides thereof, and lower alkyl (having, for example, 1 to 5 carbon atoms) esters thereof.

One of these polycarboxylic acids may be used alone, or two or more of them may be used in combination.

Examples of the polyhydric alcohol include aliphatic diols (such as ethylene glycol, diethylene glycol, triethylene glycol, propylene glycol, butanediol, hexanediol, and neopentyl glycol), alicyclic diols (such as cyclohexanediol, cyclohexanedimethanol, and hydrogenated bisphenol A), and aromatic diols (such as an ethylene oxide adduct of bisphenol A and a propylene oxide adduct of bisphenol A). In particular, the polyhydric alcohol is, for example, preferably an aromatic diol or an alicyclic diol and more preferably an aromatic diol.

The polyhydric alcohol used may be a combination of a diol and a trihydric or higher polyhydric alcohol having a crosslinked or branched structure. Examples of the trihydric or higher polyhydric alcohol include glycerin, trimethylolpropane, and pentaerythritol.

One of these polyhydric alcohols may be used alone, or two or more of them may be used in combination.

The amorphous polyester resin is obtained by a well-known production method. Specifically, the amorphous polyester resin is obtained, for example, by the following method. The polymerization temperature is set to from 180° C. to 230° C. inclusive. If necessary, the pressure inside the reaction system is reduced, and the reaction is allowed to proceed while water and alcohol generated during condensation are removed. When the raw material monomers are not dissolved or not compatible with each other at the reaction temperature, a high-boiling point solvent may be added as a solubilizer to dissolve the monomers. In this case, the polycondensation reaction is performed while the solubilizer is removed by evaporation. When a monomer with poor compatibility is present during the copolymerization reaction, the monomer with poor compatibility and an acid or an alcohol to be polycondensed with the monomer are condensed in advance, and then the resulting polycondensation product and the rest of the components are subjected to polycondensation.

The properties of the resin will be described.

From the viewpoint of reducing the occurrence of coarse particles and fine particles, the acid value of the resin is preferably from 8 mg KOH/g to 20 mg KOH/g inclusive and more preferably from 10 mg KOH/g to 16 mg KOH/g inclusive.

The acid value is determined by a neutralization titration method specified in JIS K0070 (1992). Specifically, the acid value is determined as follows.

An appropriate amount of a sample is collected, and 100 mL of a solvent (a solution mixture of diethyl ether/ethanol) and a few drops of an indicator (phenolphthalein solution) are added. Then the mixture is well-shaken in a water bath until the sample is completely dissolved. The mixture is titrated with a 0.1 mol/L potassium hydroxide ethanol solution. The point when the light red color of the indicator does not disappear for 30 seconds is defined as the end point. The acid value is denoted as A, and the weight of the sample is denoted as S (g). The volume of the 0.1 mol/L potassium hydroxide ethanol solution used for the titration is denoted as B (mL), and the factor of the 0.1 mol/L potassium hydroxide ethanol solution is denoted as f. Then the acid value is computed as $A=(B \times f \times 5.611)/S$.

The glass transition temperature (Tg) of the resin is preferably from 50° C. to 80° C. inclusive and more preferably from 50° C. to 65° C. inclusive.

The glass transition temperature is measured using a differential scanning calorimeter (DSC3110 manufactured by Mac Science Co., Ltd., thermal analysis system 001) according to JIS 7121-1987. The melting point of a mixture of indium and zinc is used to correct the temperature of a detection unit of the above apparatus, and the heat of fusion of indium is used to correct the amount of heat. A sample is placed in an aluminum pan. The aluminum pan with the sample placed therein and an empty reference pan are set in the apparatus, and the measurement is performed at a heating rate of 10° C./min.

The glass transition temperature is defined as the temperature at the intersection of the base line in an endothermic portion in the DSC curve obtained by the measurement and an extension of a rising line.

The weight average molecular weight (Mw) of the resin is preferably from 5000 to 1000000 inclusive and more preferably from 7000 to 500000 inclusive.

The number average molecular weight (Mn) of the resin may be from 2000 to 100000 inclusive.

The molecular weight distribution Mw/Mn of the resin is preferably from 1.5 to 100 inclusive and more preferably from 2 to 60 inclusive.

The weight average molecular weight and the number average molecular weight are measured by gel permeation chromatography (GPC). In the molecular weight measurement by GPC, a GPC measurement apparatus HLC-8120GPC manufactured by TOSOH Corporation is used. A TSKgel Super HM-M (15 cm) column manufactured by TOSOH Corporation and a THF solvent are used. The weight average molecular weight and the number average molecular weight are computed from the measurement results using a molecular weight calibration curve produced using monodispersed polystyrene standard samples.

No particular limitation is imposed on the amount of the resin used, and the amount may be appropriately selected according to the concentration of solids in the resin particle dispersion to be obtained.

—Neutralizer—

Examples of the neutralizer include basic compounds capable of neutralizing polar groups in the resin such as carboxyl groups, sulfonic acid groups, or hydroxy groups.

Specific examples of the neutralizer include organic bases and inorganic alkalis.

Examples of the organic base include triethanolamine, diethanolamine, N-methyldiethanolamine, and dimethylethanolamine.

Examples of the inorganic alkali include hydroxides of alkali metals (such as sodium hydroxide, lithium hydroxide, and potassium hydroxide), carbonates (such as sodium carbonate and sodium hydrogencarbonate), and ammonia.

To prevent hydrolysis of the resin, the neutralizer is preferably an amine, which is a weak base, and more preferably ammonia. Particularly preferably, ammonia in the form of an aqueous ammonia solution is added.

From the viewpoint of reducing the occurrence of coarse particles and fine particles, the total amount of the neutralizer added to 10 parts by mass of the resin is preferably from 0.02 parts by mass to 0.06 parts by mass inclusive and more preferably from 0.02 parts by mass to 0.05 parts by mass inclusive.

From the viewpoint of reducing the occurrence of coarse particles and fine particles, the rate of neutralization of the resin with the neutralizer is preferably 60% or more and less than 150% and more preferably 60% or more and less than 145%.

Specifically, the neutralizer is used such that the rate of neutralization of the resin falls within the above range.

The acid value of the resin is denoted as AV [mg-KOH/g-resin], and the valence of the neutralizer (basic material) added is denoted as n. The molecular weight of the neutralizer (basic material) added is denoted as Mwb, and the amount of the neutralizer (basic material) added per 1 g of the resin is denoted as mb [g]. Then the rate of neutralization of the resin is computed using the following formula.

The rate of neutralization of the resin [%]=mb×n×56.1/Mwb/AV×1000

—Organic Solvent—

Examples of the organic solvent include well-known solvents used for phase inversion emulsification.

From the viewpoint of improving the solubility of the resin and reducing the occurrence of coarse particles and fine particles, the organic solvent may contain at least one selected from the group consisting of esters and ketones, at least one selected from alcohols, and at least one selected from ketones.

From the viewpoint of improving the solubility of the resin and reducing the occurrence of coarse particles and fine particles, the amount of the ketone relative to 10 parts by mass of the resin is preferably from 4 parts by mass to 15 parts by mass inclusive and more preferably from 4 parts by mass to 13 parts by mass inclusive.

From the viewpoint of improving the solubility of the resin and reducing the occurrence of coarse particles and fine particles, the amount of the alcohol relative to 10 parts by mass of the resin is preferably from 1 part by mass to 5 parts by mass inclusive and more preferably from 1 part by mass to 4 parts by mass inclusive.

Examples of the ester include ethyl acetate, butyl acetate, propyl acetate, and isopropyl acetate.

Examples of the ketone include acetone, methyl ethyl ketone, cyclohexanone, butanone, and methyl isobutyl ketone.

Examples of the alcohol include methanol, ethanol, isopropyl alcohol, n-propanol, n-butanol, diacetone alcohol, and 2-ethylhexanol.

From the viewpoint of improving the solubility of the resin and reducing the occurrence of coarse particles and fine particles, the organic solvent particularly preferably contains methyl ethyl ketone as the ketone and isopropanol as the alcohol.

—Aqueous Medium—

The aqueous medium used is, for example, water (such as distilled water or ion exchanged water).

The amount of water added to the oil phase medium prepared by dissolving the resin in the organic solvent is set to, for example, an amount that allows phase inversion emulsification to proceed and the amount of waste generated to decrease.

Specifically, the amount of water added is preferably from 50% by mass to 2000% by mass inclusive and more preferably from 100% by mass to 1000% by mass inclusive based on the mass of the resin.

(Organic Solvent Removal Step)

In the organic solvent removal step, the organic solvent is removed from the phase-inverted emulsion.

To remove the organic solvent, a method in which the organic solvent is removed from the phase-inverted emulsion by reduced pressure distillation (a reduced pressure distillation method) may be used.

A well-known reduced pressure distillation method may be used, such as a method in which a reduced pressure distillation bath equipped with an agitating unit is used to perform reduced pressure distillation while the phase-inverted emulsion is bubbled with an inert gas or a method in which a so-called wall wetter is used to draw up the phase-inverted emulsion in the reduced pressure distillation bath to an upper portion of the bath to form a liquid film on a heat transfer surface of the bath in a portion above the liquid level to thereby perform reduced pressure distillation.

A well-known organic solvent removal method may be used, such as a method in which a gas (an inert gas such as nitrogen or air) is introduced into the phase-inverted emulsion under stirring to evaporate the organic solvent at the air-liquid interface (an exhaust-drying method) or a method in which the phase-inverted emulsion is repeatedly discharged in the form of a shower from small holes down to, for example, a receiving tray to evaporate the organic solvent (a shower-type solvent removal method).

By removing the organic solvent from the phase-inverted emulsion, a resin particle dispersion containing the resin particles dispersed therein is obtained.

After the removal of the organic solvent, the collected organic solvent, the collected neutralizer, the collected aqueous medium, etc. may be re-used for the production of the phase-inverted emulsion. In this manner, the cost and the environmental load may be reduced.

A surfactant may be added to the obtained resin particle dispersion.

When the resin particle dispersion contains a surfactant, the dispersibility of the resin particles may be increased, and the storage stability of the dispersion may be improved.

Examples of the surfactant include various surfactants such as anionic surfactants, amphoteric surfactants, cationic surfactants, and nonionic surfactants.

Of these, anionic surfactants may be used from the viewpoint of improving the storage stability of the resin particle dispersion.

Examples of the anionic surfactant include carboxylic acid-type anionic surfactants, sulfate-type anionic surfactants, sulfonate-type anionic surfactants, and phosphate-type anionic surfactants.

Specific examples of the anionic surfactant include fatty acid salts, rosin acid salts, naphthenic acid salts, ether carboxylic acid salts, alkenyl succinic acid salts, primary alkyl sulfates, secondary alkyl sulfates, polyoxyethylene alkyl sulfates, polyoxyethylene alkylphenyl sulfates, monoacylglycerol sulfates, acylamino sulfates, sulfated oils, sulfated fatty acid alkyl esters, α-olefin sulfonates, secondary alkane sulfonates, α-sulfofatty acid salts, acyl isethionates, dialkyl sulfosuccinates, alkylbenzenesulfonates, alkylnaphthalenesulfonates, alkyl diphenyl ether disulfonates, petroleum sulfonates, lignin sulfonates, alkyl phosphates, polyoxyethylene alkyl phosphates, polyoxyethylene alkylphenyl phosphates, perfluoroalkyl carboxylates, perfluoroalkyl sulfonates, and perfluoroalkyl phosphates.

Of these, sulfate-type or sulfonate-type anionic surfactants are more preferable, and sulfonate-type anionic surfactants are particularly preferable, from the viewpoint of improving the storage stability of the resin particle dispersion.

From the viewpoint of improving the storage stability of the resin particle dispersion, the content of the surfactant is preferably from 0.1% by mass to 10% by mass inclusive and more preferably from 0.5% by mass to 5% by mass inclusive based on the mass of the resin.

(Properties of Resin Particle Dispersion)

The volume average particle diameter of the resin particles in the resin particle dispersion according to the present exemplary embodiment is preferably from 65 nm to 220 nm inclusive and more preferably from 90 nm to 200 nm inclusive.

In the resin particle dispersion according to the present exemplary embodiment, even when the volume average particle diameter of the resin particles is in the above range, the yield is high, and the resin particle dispersion has a narrow particle size distribution.

The volume average particle diameter of the resin particles is measured as follows. A particle size distribution measured using a laser diffraction particle size measurement apparatus (e.g., LA-700 manufactured by HORIBA Ltd.) is used and divided into different particle diameter ranges (channels), and a cumulative volume distribution is computed from the small particle diameter side. The particle diameter at which the cumulative frequency is 50% relative to the total number of particles is measured as the volume average particle diameter D50v.

In the resin particle dispersion according to the present exemplary embodiment, the content of the residual organic solvent is preferably 3000 ppm or lower and more preferably 1500 ppm or lower. The lower limit of the content of the residual organic solvent is 0 ppm. However, from the viewpoint of reducing the cost for reducing the amount of the residual organic solvent, the lower limit is, for example, 25 ppm or more. The term "ppm" means the mass ratio in the resin particle dispersion after the organic solvent removal step.

When the content of the residual organic solvent in the resin particle dispersion is 3000 ppm or less, aggregation of the resin particles may be prevented, and the storage stability of the resin particle dispersion may be improved.

To adjust the content of the residual organic solvent to the above range, for example, a method may be used in which the amount of the distillate to be collected is computed in advance using the amount of the phase-inverted emulsion before distillation and the amount of the organic solvent component contained in the phase-inverted emulsion.

The concentration of solids in the resin particle dispersion according to the present exemplary embodiment may be appropriately selected as needed. The solid concentration is preferably from 1% by mass to 60% by mass inclusive, more preferably from 5% by mass to 50% by mass inclusive, and particularly preferably from 10% by mass to 50% by mass inclusive.

(Applications)

The resin particle dispersion production method according to the present exemplary embodiment is typically used as a method for producing a resin particle dispersion for a toner.

Other examples of the application of the method include methods for producing resin particle dispersions for inkjet inks, cosmetics, powder coatings, various coatings, and electronic paper inks.

<Toner Production Method/Toner>

A toner production method according to an exemplary embodiment includes the steps of:
  forming aggregated particles by aggregating, in a dispersion containing resin particles in a resin particle dispersion obtained by the resin particle dispersion production method according to the preceding exemplary embodiment, at least the resin particles (this step is hereinafter referred to as an aggregated particle forming step);
  and fusing and coalescing the aggregated particles by heating an aggregated particle dispersion containing the aggregated particles dispersed therein to thereby form toner particles (this step is hereinafter referred to as a fusion/coalescence step).

A toner according to an exemplary embodiment contains toner particles obtained by the toner production method according to the above exemplary embodiment.

The above steps will next be described in detail.

In the following description, a method for obtaining toner particles containing a coloring agent and a release agent will be described, but the coloring agent and the release agent are used optionally. Of course, additional additives other than the coloring agent and the release agent may be used.

—Resin Particle Dispersion Preparing Step—

In a resin particle dispersion preparing step, a resin particle dispersion, a coloring agent particle dispersion, and a release agent particle dispersion are prepared.

Resin Particle Dispersion

The resin particle dispersion is produced using the resin particle dispersion production method according to the preceding exemplary embodiment.

However, a resin particle dispersion other than the resin particle dispersion obtained using the resin particle dispersion production method according to the preceding exemplary embodiment may also be used.

Coloring Agent Particle Dispersion

The coloring agent particle dispersion is a dispersion obtained by dispersing a coloring agent in at least an aqueous medium.

Examples of the coloring agent include: various pigments such as carbon black, chrome yellow, Hansa yellow, benzidine yellow, threne yellow, quinoline yellow, pigment yellow, permanent orange GTR, pyrazolone orange, vulcan orange, watchung red, permanent red, brilliant carmine 3B, brilliant carmine 6B, DuPont oil red, pyrazolone red, lithol red, rhodamine B lake, lake red C, pigment red, rose bengal, aniline blue, ultramarine blue, calco oil blue, methylene blue chloride, phthalocyanine blue, pigment blue, phthalocyanine green, and malachite green oxalate; and various dyes such as acridine-based dyes, xanthene-based dyes, azo-based dyes, benzoquinone-based dyes, azine-based dyes, anthraquinone-based dyes, thioindigo-based dyes, dioxazine-based dyes, thiazine-based dyes, azomethine-based dyes, indigo-based dyes, phthalocyanine-based dyes, aniline black-based dyes, polymethine-based dyes, triphenylmethane-based dyes, diphenylmethane-based dyes, and thiazole-based dyes.

One of these coloring agents may be used alone, or two or more of them may be used in combination.

The coloring agent is dispersed in an aqueous medium using a well-known method. For example, a rotary shearing-type homogenizer, a media-type disperser such as a ball mill, a sand mill, or an attritor, or a high-pressure counter collision-type disperser may be used. The coloring agent may be dispersed in the aqueous medium using a polar ionic surfactant and using a homogenizer to thereby produce the coloring agent particle dispersion.

The volume average particle diameter of the coloring agent is preferably 1 μm or less, more preferably 0.5 μm or less, and particularly preferably from 0.01 μm to 0.5 μm inclusive.

A dispersant may be added in order to improve the dispersion stability of the coloring agent in the aqueous medium to thereby reduce the energy of the coloring agent in the toner, and examples of the dispersant include rosin, rosin derivatives, coupling agents, and polymeric dispersants.

Release Agent Particle Dispersion

The release agent particle dispersion is a dispersion obtained by dispersing a release agent in at least an aqueous medium.

Examples of the release agent include: hydrocarbon-based waxes; natural waxes such as carnauba wax, rice wax, and candelilla wax; synthetic and mineral/petroleum-based waxes such as montan wax; and ester-based waxes such as fatty acid esters and montanic acid esters. The release agent used is not limited to the above release agents.

One of these release agents may be used alone, or two or more of them may be used in combination.

The melting temperature of the release agent is preferably from 50° C. to 110° C. inclusive and more preferably from 60° C. to 100° C. inclusive.

The melting temperature is determined using a DSC curve obtained by differential scanning calorimetry (DSC) from "peak melting temperature" described in melting temperature determination methods in "Testing methods for transition temperatures of plastics" in JIS K7121-1987.

The release agent is dispersed in the aqueous medium using a well-known method. For example, a rotary shearing-type homogenizer, a media-type disperser such as a ball mill, a sand mill, or an attritor, or a high-pressure counter collision-type disperser may be used. The release agent may be dispersed in the aqueous medium using a polar ionic surfactant and using a homogenizer to thereby produce the release agent particle dispersion.

The volume average particle diameter of the release agent particles is preferably 1 μm or less and more preferably from 0.01 μm to 1 μm inclusive.

—Aggregated Particle Forming Step—

Next, the resin particle dispersion, the coloring agent particle dispersion, and the release agent particle dispersion are mixed.

Then the resin particles, the coloring agent particles, and the release agent particles are hetero-aggregated in the dispersion mixture to form aggregated particles containing the resin particles, the coloring agent particles, and the release agent particles and having diameters close to the diameters of target toner particles.

Specifically, for example, a flocculant is added to the dispersion mixture, and the pH of the dispersion mixture is adjusted to acidic (for example, a pH of from 2 to 5 inclusive). Then a dispersion stabilizer is optionally added, and the resulting mixture is heated to the glass transition temperature of the resin particles (specifically, for example, a temperature equal to higher than the glass transition temperature of the resin particles −30° C. and equal to or lower than the glass transition temperature −10° C.) to aggregate the particles dispersed in the dispersion mixture to thereby form aggregated particles.

In the aggregated particle forming step, for example, the flocculant is added at room temperature (e.g., 25° C.) while the dispersion mixture is agitated in a rotary shearing-type homogenizer. Then the pH of the dispersion mixture is adjusted to acidic (e.g., a pH of from 2 to 5 inclusive), and the dispersion stabilizer is optionally added. Then the resulting mixture is heated in the manner described above.

Examples of the flocculant include a surfactant with a polarity opposite to the polarity of the surfactant added to the dispersion mixture, inorganic metal salts, and divalent or higher polyvalent metal complexes. In particular, when a metal complex is used as the flocculant, the amount of the surfactant used can be reduced, and charging characteristics may be improved.

An additive that forms a complex with a metal ion in the flocculant or a similar bond may be optionally used. The additive used may be a chelating agent.

Examples of the inorganic metal salts include: metal salts such as calcium chloride, calcium nitrate, barium chloride, magnesium chloride, zinc chloride, aluminum chloride, and aluminum sulfate; and inorganic metal salt polymers such as polyaluminum chloride, polyaluminum hydroxide, and calcium polysulfide.

The chelating agent used may be a water-soluble chelating agent. Examples of the chelating agent include: oxycarboxylic acids such as tartaric acid, citric acid, and gluconic acid; iminodiacetic acid (IDA); nitrilotriacetic acid (NTA); and ethylenediaminetetraacetic acid (EDTA).

The amount of the chelating agent added is, for example, preferably from 0.01 parts by mass to 5.0 parts by mass inclusive and more preferably 0.1 parts by mass or more and less than 3.0 parts by mass based on 100 parts by mass of the resin particles.

—Fusion/Coalescence Step—

Next, the aggregated particle dispersion containing the aggregated particles dispersed therein is heated, for example, to a temperature equal to or higher than the glass transition temperature of the resin particles (e.g., a temperature higher by 10° C. to 30° C. than the glass transition temperature of the resin particles) to fuse and coalesce the aggregated particles to thereby form toner particles.

The toner particles are obtained through the above-described steps.

Alternatively, the toner particles may be produced through: the step of, after the preparation of the aggregated particle dispersion containing the aggregated particles dispersed therein, mixing the aggregated particle dispersion further with the resin particle dispersion containing the resin particles dispersed therein and then causing the resin particles to adhere to the surface of the aggregated particles to aggregate them to thereby form second aggregated particles; and the step of heating a second aggregated particle dispersion containing the second aggregated particles dispersed therein to fuse and coalesce the second aggregated particles to thereby form toner particles having a core-shell structure.

After completion of the fusion/coalescence step, the toner particles formed in the solution are subjected to a well-known washing step, a solid-liquid separation step, and a drying step to obtain dried toner particles.

From the viewpoint of chargeability, the toner particles may be subjected to displacement washing with ion exchanged water sufficiently in the washing step. No particular limitation is imposed on the solid-liquid separation step. From the viewpoint of productivity, suction filtration, pressure filtration, etc. may be performed in the solid-liquid separation step. No particular limitation is imposed on the drying step. From the viewpoint of productivity, freeze-drying, flash drying, fluidized drying, vibrating fluidized drying, etc. may be performed in the drying step.

The toner according to the present exemplary embodiment is produced, for example, by adding an external additive to the dried toner particles obtained and mixing them. The mixing may be performed, for example, using a V blender, a Henschel mixer, a Loedige mixer, etc. If necessary, coarse particles in the toner may be removed using a vibrating sieving machine, an air sieving machine, etc.

Examples of the external additive include inorganic particles. Examples of the inorganic particles include particles of $SiO_2$, $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaO·SiO_2$, $K_2O·(TiO_2)n$, $Al_2O_3·2SiO_2$, $CaCO_3$, $MgCO_3$, $BaSO_4$, and $MgSO_4$.

The surface of the inorganic particles used as the external additive may be subjected to hydrophobic treatment. The hydrophobic treatment is performed, for example, by immersing the inorganic particles in a hydrophobic treatment agent. No particular limitation is imposed on the hydrophobic treatment agent, and examples of the hydrophobic treatment agent include silane-based coupling agents, silicone oils, titanate-based coupling agents, and aluminum-based coupling agents. One of these may be used alone, or two or more of them may be used in combination.

The amount of the hydrophobic treatment agent is generally, for example, from 1 part by mass to 10 parts by mass inclusive based on 100 parts by mass of the inorganic particles.

Other examples of the external additive include resin particles (particles of resins such as polystyrene, polymethyl methacrylate (PMMA), and melamine resins) and cleaning activators (such as metal salts of higher fatty acids typified by zinc stearate and fluorine-based polymer particles).

The amount of the external additive added externally is, for example, preferably from 0.01% by mass to 5% by mass inclusive and more preferably from 0.01% by mass to 2.0% by mass inclusive relative to the mass of the toner particles.

—Properties of Toner—

In the toner according to the present exemplary embodiment, the toner particles may have a single layer structure or may be toner particles each having a so-called core-shell structure including a core (core particle) and a coating layer (shell layer) covering the core.

The toner particles having the core-shell structure may each include, for example: a core containing the binder resin and optional additives such as the coloring agent and the release agent; and a coating layer containing the binder resin.

The volume average particle diameter (D50v) of the toner particles is preferably from 2 μm to 10 μm inclusive and more preferably from 4 μm to 8 μm inclusive.

The volume average particle diameters of the toner particles and their grain size distribution indexes are measured using Coulter Multisizer II (manufactured by Beckman Coulter, Inc.), and ISOTON-II (manufactured by Beckman Coulter, Inc.) is used as an electrolyte.

In the measurement, 0.5 mg to 50 mg of a measurement sample is added to 2 mL of a 5% aqueous solution of a surfactant (preferably sodium alkylbenzenesulfonate) serving as a dispersant. The mixture is added to 100 mL to 150 mL of the electrolyte.

The electrolyte with the sample suspended therein is subjected to dispersion treatment for 1 minute using an ultrasonic dispersion apparatus, and then the particle size distribution of particles having diameters within the range of 2 μm to 60 μm is measured using the Coulter Multisizer II with an aperture having an aperture diameter of 100 μm. The number of particles sampled is 50,000.

The particle size distribution measured and divided into particle size ranges (channels) is used to obtain volume-based and number-based cumulative distributions computed from the small diameter side. In the computed volume-based cumulative distribution, the particle diameter at a cumulative frequency of 16% is defined as a volume-based particle diameter D16v, and the particle diameter at a cumulative frequency of 50% is defined as a volume average particle diameter D50v. The particle diameter at a cumulative frequency of 84% is defined as a volume-based particle diameter D84v. In the number-based cumulative distribution, the particle diameter at a cumulative frequency of 16% is defined as a number-based particle diameter D16p, and the particle diameter at a cumulative frequency of 50% is defined as a number average cumulative particle diameter D50p. Moreover, the particle diameter at a cumulative frequency of 84% is defined as a number-based particle diameter D84p.

These are used to compute a volume-based grain size distribution index (GSDv) defined as $(D84v/D16v)^{1/2}$ and a number-based grain size distribution index (GSDp) defined as $(D84p/D16p)^{1/2}$.

The average circularity of the toner particles is preferably from 0.94 to 1.00 inclusive and more preferably from 0.95 to 0.98 inclusive.

The circularity of a toner particle is determined as (the peripheral length of an equivalent circle of the toner particle)/(the peripheral length of the toner particle) [i.e., (the peripheral length of a circle having the same area as a projection image of the particle)/(the peripheral length of the projection image of the particle)]. Specifically, the average circularity is a value measured by the following method.

First, the toner particles used for the measurement are collected by suction, and a flattened flow of the particles is formed. Particle images are captured as still images using flashes of light, and the average circularity is determined by subjecting the particle images to image analysis using a flow-type particle image analyzer (FPIA-3000 manufactured by SYSMEX Corporation). The number of particles sampled for determination of the average circularity is 3500.

When the toner contains the external additive, the toner (developer) for the measurement is dispersed in water containing a surfactant, and the dispersion is subjected to ultrasonic treatment. The toner particles with the external additive removed are thereby obtained.

<Electrostatic Image Developer>

An electrostatic image developer according to an exemplary embodiment contains at least the toner according to the preceding exemplary embodiment.

The electrostatic image developer according to the present exemplary embodiment may be a one-component developer containing only the toner according to the preceding exemplary embodiment or a two-component developer containing the toner and a carrier.

No particular limitation is imposed on the carrier, and a well-known carrier may be used. Examples of the carrier include: a coated carrier prepared by coating the surface of a core material formed of a magnetic powder with a coating resin; a magnetic powder-dispersed carrier prepared by dispersing a magnetic powder in a matrix resin; and a resin-impregnated carrier prepared by impregnating a porous magnetic powder with a resin.

In each of the magnetic powder-dispersed carrier and the resin-impregnated carrier, the particles included in the carrier may be used as cores, and the cores may be coated with a coating resin.

EXAMPLES

Examples of the present disclosure will be described. However, the present disclosure is not limited to these Examples. In the following description, "parts" and "%" are all based on mass, unless otherwise specified.

<Synthesis of Amorphous Polyester Resin (1)>

Terephthalic acid: 69 parts
Trimellitic acid: 31 parts
Ethylene glycol: 48 parts
1,5-Pentanediol: 47 parts The above materials are placed in a reaction vessel equipped with a stirrer, a condenser, a nitrogen introduction tube, a thermometer, and a temperature controller. The temperature of the mixture is increased to 220° C. in a nitrogen flow over 1 hour, and 1 part of titanium tetraethoxide is added to 100 parts of the mixture of the above materials. While water generated is removed by evaporation, the temperature of the resulting mixture is increased to 240° C. over 0.5 hours. A dehydration condensation reaction is continued at 240° C. for 1 hour, and the reaction product is cooled. An amorphous polyester resin (1) having an acid value of 8.0 mg KOH/g, a weight average molecular weight of 139000, and a glass transition temperature of 60° C. is thereby obtained.

<Synthesis of Amorphous Polyester Resin (2)>

The same procedure as for the amorphous polyester resin (1) is repeated except that the amount of the ethylene glycol is changed to 43.5 parts and the amount of the 1,5-pentanediol is changed to 45.5 parts to thereby obtain an amorphous polyester resin (2) having an acid value of 12.5 mg KOH/g, a weight average molecular weight of 127000, and a glass transition temperature of 59° C.

<Synthesis of Amorphous Polyester Resin (3)>

The same procedure as for the amorphous polyester resin (1) is repeated except that the amount of the ethylene glycol is changed to 36 parts and the amount of the 1,5-pentanediol is changed to 39 parts to thereby obtain an amorphous polyester resin (3) having an acid value of 20.0 mg KOH/g, a weight average molecular weight of 116000, and a glass transition temperature of 58° C.

<Synthesis of Amorphous Polyester Resin (4)>

The same procedure as for the amorphous polyester resin (1) is repeated except that the amount of the ethylene glycol is changed to 49 parts and the amount of the 1,5-pentanediol is changed to 47.5 parts to thereby obtain an amorphous polyester resin (4) having an acid value of 7.0 mg KOH/g, a weight average molecular weight of 140000, and a glass transition temperature of 60° C.

<Synthesis of amorphous polyester resin (5)>

The same procedure as for the amorphous polyester resin (1) is repeated except that the amount of the ethylene glycol is changed to 35 parts and the amount of the 1,5-pentanediol is changed to 38 parts to thereby obtain an amorphous polyester resin (5) having an acid value of 21.0 mg KOH/g, a weight average molecular weight of 113000, and a glass transition temperature of 58° C.

<Synthesis of Crystalline Polyester Resin>

Decanedioic acid: 81 parts
Hexanediol: 47 parts

The above materials are placed in a reaction tank, and the temperature of the mixture is increased to 160° C. over 1 hour. After confirmation that the reaction system has been uniformly stirred, 0.03 parts of dibutyl tin oxide is added. While water generated is removed by evaporation, the temperature of the mixture is increased to 200° C. over 6 hours, and the mixture is continuously agitated at 200° C. for 4 hours. Next, the reaction mixture is cooled and subjected to solid-liquid separation, and the solids are dried at 40° C. under reduced pressure to thereby obtain a crystalline polyester resin (melting point: 64° C., weight average molecular weight: 15,000).

<Production of Crystalline Polyester Resin Dispersion>

Crystalline polyester resin: 50 parts
Anionic surfactant (NEOGEN RK manufactured by DAI-ICHI KOGYO SEIYAKU Co., Ltd.): 2 parts
Ion exchanged water: 200 parts The above materials are heated to 120° C. and subjected to dispersion treatment using a pressure ejection-type Gaulin homogenizer. When the volume average particle diameter has reached 180 nm, the product is collected to thereby obtain a crystalline polyester resin dispersion having a sold content of 20%.

<Production of Release Agent Particle Dispersion>

Paraffin wax (HNP-9 manufactured by Nippon Seiro Co., Ltd.): 100 parts
Anionic surfactant (NEOGEN RK manufactured by DAI-ICHI KOGYO SEIYAKU Co., Ltd.): 1 part
Ion exchanged water: 350 parts The above materials are mixed, heated to 100° C., and subjected to dispersion treatment using a pressure ejection-type Gaulin homogenizer to thereby obtain a release agent particle dispersion in which release agent particles having a volume average particle diameter of 200 nm are dispersed. Ion exchanged water is added to the release agent particle dispersion to adjust the solid content of the release agent particle dispersion to 20%.

<Production of Coloring Agent Particle Dispersion>

Carbon black (Regal 330 manufactured by Cabot Corporation): 50 parts
Anionic surfactant (NEOGEN RK manufactured by DAI-ICHI KOGYO SEIYAKU Co., Ltd.): 5 parts
Ion exchanged water: 195 parts The above materials are mixed and subjected to dispersion treatment at 240 MPa for 10 minutes using STAR BURST (manufactured by Sugino Machine Limited) to thereby obtain a coloring agent particle dispersion having a solid content of 20%.

<Production of Silica Particles>

Water, methanol, and ammonia water are mixed sufficiently, and then tetramethoxysilane and ammonia water are added dropwise under heating. Next, hexamethyldisilazane (HMDS) is added to the silica sol suspension obtained by the reaction to perform hydrophobic treatment, and the silica sol is dried to obtain silica particles. Then the silica particles are pulverized to thereby obtain silica particles having a volume average particle diameter D50v of 160 nm.

Example 1

[Synthesis of Fine Resin Particle Dispersion (1)]

An emulsification tank equipped with an agitator including an anchor mixing impeller (Di/Dt=0.98), a condenser, a thermometer, and a temperature controller is charged with 10 parts of the amorphous polyester resin (2) used as the resin, 9 parts of methyl ethyl ketone (MEK) used as the organic solvent, and 2.5 parts of isopropanol used as the organic solvent, and then the mixture is agitated at 60° C. for 30 minutes to dissolve the resin.

Ammonia water used as the neutralizer is added in an amount corresponding to 0.04 parts relative to 10 parts of the resin (the rate of neutralization of the resin=124%) to the resin-dissolved solution obtained. The inner temperature of the emulsification tank (i.e., the temperature of the resin-dissolved solution) is adjusted to 50° C., and the number of rotations for agitation is adjusted to 40 rpm. Then pure water whose temperature has been adjusted to the temperature inside the tank is continuously added at a rate of 0.2 parts/min to perform phase inversion emulsification. A phase-inverted emulsion is thereby obtained. The maximum agitation power per unit mass (kg) of the resin during the phase inversion emulsification is 9.1 W.

Then the organic solvent is removed from the phase-inverted emulsion until the concentration of the organic solvent remaining in the phase-inverted emulsion reaches 1000 ppm, and a resin particle dispersion (1) is thereby obtained.

Examples 2 to 30 and Comparative Examples 1 to 2

Resin particle dispersions are obtained using the same procedure as in Example 1 except that conditions shown in Tables 1-1 and 1-2 are used.
<Evaluation>
<Occurrence of Coarse Particles>
The occurrence of coarse particles in the resin particle dispersion in each Example is evaluated as follows.
A scanning electron microscope (SEM: S-4700 manufactured by Hitachi High-Tech Corporation) is used to observe resin particles in 20 viewing fields at 30000×, and the number of particles having a diameter equal to or larger than two times the volume average particle diameter is determined as the number of coarse particles. The number of coarse particles is evaluated according to the following criteria.
A: The number of coarse particles is less than 1.
B: The number of coarse particles is 1.
C: The number of coarse particles is 2.
D: The number of coarse particles is 3.
E: The number of coarse particles is 4 or more.
[Occurrence of Fine Particles]
The occurrence of fine particles in the resin particle dispersion in each Example is evaluated as follows.
A scanning electron microscope (SEM: S-4700 manufactured by Hitachi High-Tech Corporation) is used to observe resin particles in 20 viewing fields at 80000×, and the number of particles having a diameter equal to or smaller than ⅓ of the volume average particle diameter is determined as the number of fine particles. The number of fine particles is evaluated according to the following criteria.
A: The number of fine particles is less than 1.
B: The number of fine particles is from 1 to 3 inclusive.
C: The number of fine particles is from 4 to 9 inclusive.
D: The number of fine particles is from 10 to 14 inclusive.
E: The number of fine particles is 15 or more.
[Production of Toner]
The resin particle dispersion in one of the Examples is used as an amorphous resin particle dispersion, and a toner is produced as follows.
Ion exchanged water: 200 parts
Amorphous polyester resin dispersion: 150 parts
Crystalline polyester resin dispersion: 10 parts
Release agent particle dispersion: 10 parts
Coloring agent particle dispersion: 15 parts
Anionic surfactant (TaycaPower): 2.8 parts
The above materials are placed in an agitating bath equipped with a temperature controlling jacket, and 0.1N nitric acid is added to adjust the pH to 3.5. Then an aqueous poly-aluminum chloride solution prepared by dissolving 2 parts of poly-aluminum chloride (manufactured by Oji Paper Co., Ltd., 30% powder) in 30 parts of ion exchanged water is added. The mixture is subjected to dispersion treatment using a homogenizer, and the resulting dispersion is heated to 45° C. and held until the volume average particle diameter reaches 4.9 μm. Then 60 parts of the amorphous polyester resin dispersion is further added, and the resulting mixture is held for 30 minutes. Next, when the volume average particle diameter has reached 5.2 μm, 60 parts of the amorphous polyester resin dispersion (1) is further added, and the mixture is held for 30 minutes. Then 20 parts of an aqueous 10% NTA (nitrilotriacetic acid) metal salt solution (Chelest 70 manufactured by CHELEST CORPORATION) is added, and then an aqueous 1N sodium hydroxide solution is added to adjust the pH to 9.0. Next, 1 part of an anionic surfactant (TaycaPower) is added, and the resulting mixture is heated to 85° C. under continuous stirring and held for 5 hours. Then the mixture is cooled to 20° C. at a rate of 20° C./min.

Next, the resulting mixture is filtrated, washed sufficiently with ion exchanged water, and dried to thereby obtain toner particles.

Next, 2.3 parts of silica particles are mixed with 100 parts of the toner particles at a peripheral speed of 20 m/s for 15 minutes using a Henschel mixer to thereby obtain a toner.
[Evaluation of Image Unevenness]
A printer DocuCentre-IV C5570 manufactured by Fuji Xerox Co., Ltd. is used to print an image with an image density of 30% on 100 sheets in a high-temperature and high-humidity environment (28° C. and 85% RH). An image density meter X-Rite 938 (manufactured by X-Rite) is used to measure the image density at 10 randomly selected points on the outputted images. An image density difference defined as the difference between the maximum density measured and the minimum density measured is determined, and the image density unevenness is evaluated according to the following criteria.
A: The image density difference is 0.1 or less.
B: The image density difference is more than 0.1 and 0.15 or less.
C: The image density difference is more than 0.15 and 0.2 or less.
D: The image density difference is more than 0.2 and 0.3 or less.
E: The image density difference is more than 0.3.

TABLE 1-1

| | | | | | | Phase-inverted emulsion production conditions | | | | | | | |
|---|---|---|---|---|---|---|---|---|---|---|---|---|---|
| | Image density unevenness | Occurrence of coarse particles | Occurrence of fine particles | Resin particle dispersion | Amorphous polyester resin | Maximum agitation power per kg of resin W | Acid value of polyester resin mgKOH/g | Amount of organic solvent MEK Parts based on 10 parts of resin | Amount of organic solvent IPA Parts based on 10 parts of resin | Amount of ammonia Parts based on 10 parts of resin | Temperature of resin-dissolved solution ° C. | Water addition rate Parts based on 10 parts of resin/min | Di/Dt | Number of rotations for agitation rpm |
| Comparative Example 1 | E | E | D | (31) | (2) | 0.3 | 12.5 | 9 | 2.5 | 0.04 | 50 | 0.2 | 0.98 | 8 |
| Comparative Example 2 | E | C | E | (32) | (2) | 21 | 12.5 | 9 | 2.5 | 0.04 | 50 | 0.2 | 0.98 | 105 |
| Example 1 | A | A | A | (1) | (2) | 9.1 | 12.5 | 9 | 2.5 | 0.04 | 50 | 0.2 | 0.98 | 40 |
| Example 2 | D | D | D | (2) | (2) | 0.4 | 12.5 | 9 | 2.5 | 0.04 | 50 | 0.2 | 0.98 | 10 |

TABLE 1-1-continued

|  | Image density un-even-ness | Occurrence of coarse particles | Occurrence of fine particles | Resin particle dispersion | Amorphous polyester resin | Maximum agitation power per kg of resin W | Acid value of polyester resin mgKOH/g | Phase-inverted emulsion production conditions ||||||||
|---|---|---|---|---|---|---|---|---|---|---|---|---|---|
|  |  |  |  |  |  |  |  | Amount of organic solvent MEK Parts based on 10 parts of resin | Amount of organic solvent IPA Parts based on 10 parts of resin | Amount of ammonia Parts based on 10 parts of resin | Temperature of resin-dissolved solution ° C. | Water addition rate Parts based on 10 parts of resin/min | Di/Dt | Number of rotations for agitation rpm |
| Example 3 | D | B | D | (3) | (2) | 20 | 12.5 | 9 | 2.5 | 0.04 | 50 | 0.2 | 0.98 | 100 |
| Example 4 | D | C | D | (4) | (4) | 16.3 | 7 | 9 | 2.5 | 0.025 | 50 | 0.2 | 0.98 | 40 |
| Example 5 | C | B | C | (5) | (1) | 15.3 | 8 | 9 | 2.5 | 0.025 | 50 | 0.2 | 0.98 | 40 |
| Example 6 | B | A | B | (6) | (3) | 7.2 | 20 | 9 | 2.5 | 0.05 | 50 | 0.2 | 0.98 | 40 |
| Example 7 | C | B | C | (7) | (5) | 6.7 | 21 | 9 | 2.5 | 0.05 | 50 | 0.2 | 0.98 | 40 |
| Example 8 | D | C | D | (8) | (2) | 19.6 | 12.5 | 3.5 | 2.5 | 0.04 | 50 | 0.2 | 0.98 | 40 |
| Example 9 | C | B | C | (9) | (2) | 19.1 | 12.5 | 4 | 2.5 | 0.04 | 50 | 0.2 | 0.98 | 40 |
| Example 10 | B | C | B | (10) | (2) | 1.5 | 12.5 | 15 | 2.5 | 0.04 | 50 | 0.2 | 0.98 | 40 |
| Example 11 | C | C | C | (11) | (2) | 1.4 | 12.5 | 15.5 | 2.5 | 0.04 | 50 | 0.2 | 0.98 | 40 |
| Example 12 | C | C | C | (12) | (2) | 13.5 | 12.5 | 9 | 0.5 | 0.04 | 50 | 0.2 | 0.98 | 40 |
| Example 13 | B | A | B | (13) | (2) | 12.7 | 12.5 | 9 | 1 | 0.04 | 50 | 0.2 | 0.98 | 40 |
| Example 14 | B | B | A | (14) | (2) | 6.4 | 12.5 | 9 | 5 | 0.04 | 50 | 0.2 | 0.98 | 40 |
| Example 15 | C | B | C | (15) | (2) | 6.9 | 12.5 | 9 | 5.5 | 0.04 | 50 | 0.2 | 0.98 | 40 |
| Example 16 | C | D | C | (16) | (2) | 6.8 | 12.5 | 9 | 2.5 | 0.015 | 50 | 0.2 | 0.98 | 40 |

TABLE 1-2

|  | Image density un-even-ness | Occurrence of coarse particles | Occurrence of fine particles | Resin particle dispersion | Amorphous polyester resin | Maximum agitation power per kg of resin W | Acid value of polyester resin mgKOH/g | Phase-inverted emulsion production conditions ||||||||
|---|---|---|---|---|---|---|---|---|---|---|---|---|---|
|  |  |  |  |  |  |  |  | Amount of organic solvent MEK Parts based on 10 parts of resin | Amount of organic solvent IPA Parts based on 10 parts of resin | Amount of ammonia Parts based on 10 parts of resin | Temperature of resin-dissolved solution ° C. | Water addition rate Parts based on 10 parts of resin/min | Di/Dt | Number of rotations for agitation rpm |
| Example 17 | B | D | B | (17) | (2) | 7.3 | 12.5 | 9 | 2.5 | 0.02 | 50 | 0.2 | 0.98 | 40 |
| Example 18 | B | A | B | (18) | (2) | 9.9 | 12.5 | 9 | 2.5 | 0.06 | 50 | 0.2 | 0.98 | 40 |
| Example 19 | B | B | B | (19) | (2) | 10.2 | 12.5 | 9 | 2.5 | 0.065 | 50 | 0.2 | 0.98 | 40 |
| Example 20 | D | C | D | (20) | (2) | 19.3 | 12.5 | 9 | 2.5 | 0.04 | 18 | 0.2 | 0.98 | 40 |
| Example 21 | D | B | D | (21) | (2) | 18.2 | 12.5 | 9 | 2.5 | 0.04 | 20 | 0.2 | 0.98 | 40 |
| Example 22 | B | A | B | (22) | (2) | 8.3 | 12.5 | 9 | 2.5 | 0.04 | 80 | 0.2 | 0.98 | 40 |
| Example 23 | C | B | C | (23) | (2) | 7.5 | 12.5 | 9 | 2.5 | 0.04 | 82 | 0.2 | 0.98 | 40 |
| Example 24 | C | A | C | (24) | (2) | 5.8 | 12.5 | 9 | 2.5 | 0.04 | 50 | 0.02 | 0.98 | 40 |
| Example 25 | B | A | B | (25) | (2) | 6.1 | 12.5 | 9 | 2.5 | 0.04 | 50 | 0.03 | 0.98 | 40 |
| Example 26 | C | D | C | (26) | (2) | 14.5 | 12.5 | 9 | 2.5 | 0.04 | 50 | 0.85 | 0.98 | 40 |
| Example 27 | D | D | D | (27) | (2) | 15.3 | 12.5 | 9 | 2.5 | 0.04 | 50 | 0.90 | 0.98 | 40 |
| Example 28 | B | B | B | (28) | (2) | 7.4 | 12.5 | 9 | 2.5 | 0.04 | 50 | 0.2 | 0.89 | 40 |
| Example 29 | B | A | B | (29) | (2) | 8.2 | 12.5 | 9 | 2.5 | 0.04 | 50 | 0.2 | 0.90 | 40 |
| Example 30 | B | A | B | (30) | (2) | 10.5 | 12.5 | 9 | 2.5 | 0.04 | 50 | 0.2 | 0.99 | 40 |

As can be seen from the above results, in the Examples, the occurrence of coarse particles and fine particles in the resin particle dispersion is reduced as compared to that in the Comparative Examples.

Moreover, with the toners produced using the resin particle dispersions in the Examples, the occurrence of image density unevenness is reduced as compared to that in the Comparative Examples.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A method for producing a resin particle dispersion, the method comprising:
   obtaining a phase-inverted emulsion by adding a neutralizer to a resin solution prepared by dissolving a resin having an acid value in an organic solvent to thereby neutralize the resin and then adding an aqueous medium to the resulting resin solution to subject the resin to phase inversion emulsification; and removing the organic solvent from the phase-inverted emulsion, wherein, in the course of obtaining the phase-inverted emulsion, a maximum agitation power per unit mass (kg) of the resin when the resin solution containing the aqueous medium added thereto is agitated to perform the phase inversion emulsification is from 0.4 W to 20 W inclusive.

2. The method for producing a resin particle dispersion according to claim 1, wherein the resin has an acid value of from 8 mg KOH/g to 20 mg KOH/g inclusive.

3. The method for producing a resin particle dispersion according to claim 1, wherein the resin is a polyester resin.

4. The method for producing a resin particle dispersion according to claim 2, wherein the resin is a polyester resin.

5. The method for producing a resin particle dispersion according to claim 1, wherein the organic solvent contains at least one selected from ketones and at least one selected from alcohols,
wherein the amount of the at least one selected from ketones relative to 10 parts by mass of the resin is from 4 parts by mass to 15 parts by mass inclusive, and
wherein the amount of the at least one selected from alcohols relative to 10 parts by mass of the resin is from 1 part by mass to 5 parts by mass inclusive.

6. The method for producing a resin particle dispersion according to claim 2, wherein the organic solvent contains at least one selected from ketones and at least one selected from alcohols,
wherein the amount of the at least one selected from ketones relative to 10 parts by mass of the resin is from 4 parts by mass to 15 parts by mass inclusive, and
wherein the amount of the at least one selected from alcohols relative to 10 parts by mass of the resin is from 1 part by mass to 5 parts by mass inclusive.

7. The method for producing a resin particle dispersion according to claim 3, wherein the organic solvent contains at least one selected from ketones and at least one selected from alcohols,
wherein the amount of the at least one selected from ketones relative to 10 parts by mass of the resin is from 4 parts by mass to 15 parts by mass inclusive, and
wherein the amount of the at least one selected from alcohols relative to 10 parts by mass of the resin is from 1 part by mass to 5 parts by mass inclusive.

8. The method for producing a resin particle dispersion according to claim 4, wherein the organic solvent contains at least one selected from ketones and at least one selected from alcohols,
wherein the amount of the at least one selected from ketones relative to 10 parts by mass of the resin is from 4 parts by mass to 15 parts by mass inclusive, and
wherein the amount of the at least one selected from alcohols relative to 10 parts by mass of the resin is from 1 part by mass to 5 parts by mass inclusive.

9. The method for producing a resin particle dispersion according to claim 5, wherein the at least one selected from ketones is methyl ethyl ketone, and the at least one selected from alcohols is isopropanol.

10. The method for producing a resin particle dispersion according to claim 6, wherein the at least one selected from ketones is methyl ethyl ketone, and the at least one selected from alcohols is isopropanol.

11. The method for producing a resin particle dispersion according to claim 7, wherein the at least one selected from ketones is methyl ethyl ketone, and the at least one selected from alcohols is isopropanol.

12. The method for producing a resin particle dispersion according to claim 8, wherein the at least one selected from ketones is methyl ethyl ketone, and the at least one selected from alcohols is isopropanol.

13. The method for producing a resin particle dispersion according to claim 1, wherein the neutralizer is ammonia, and
wherein the total amount of the neutralizer added relative to 10 parts by mass of the resin is from 0.02 parts by mass to 0.06 parts by mass inclusive.

14. The method for producing a resin particle dispersion according to claim 2, wherein the neutralizer is ammonia, and
wherein the total amount of the neutralizer added relative to 10 parts by mass of the resin is from 0.02 parts by mass to 0.06 parts by mass inclusive.

15. The method for producing a resin particle dispersion according to claim 1, wherein the temperature of the resin solution containing the aqueous medium added thereto during the phase inversion emulsification is from 20° C. to 80° C. inclusive.

16. The method for producing a resin particle dispersion according to claim 1, wherein the aqueous medium is continuously added to the resin solution, and
wherein the rate of addition of the aqueous medium to 10 parts by mass of the resin is from 0.03 parts by mass/min to 0.80 parts by mass/min inclusive.

17. The method for producing a resin particle dispersion according to claim 1, wherein the phase inversion emulsification of the resin is performed using an emulsification tank equipped with an anchor mixing impeller,
wherein the ratio Di/Dt of an impeller diameter Di of the anchor mixing impeller to a tank diameter Dt of the emulsification tank is from 0.90 to 0.99 inclusive, and
wherein the number of rotations of the anchor mixing impeller is from 10 rpm to 100 rpm inclusive.

18. The method for producing a resin particle dispersion according to claim 1, wherein a resin particle dispersion for a toner is produced.

19. A method for producing a toner for electrostatic image development, the method comprising:
forming aggregated particles by aggregating, in a dispersion containing resin particles in a resin particle dispersion obtained by the resin particle dispersion production method according to claim 1, at least the resin particles; and
fusing and coalescing the aggregated particles by heating an aggregated particle dispersion containing the aggregated particles dispersed therein to thereby form toner particles.

20. A toner for electrostatic image development comprising toner particles obtained by the method for producing a toner for electrostatic image development according to claim 19.

* * * * *